A

United States Patent [19]
Marshall

[11] Patent Number: 5,853,193
[45] Date of Patent: Dec. 29, 1998

[54] PASSENGER SAFETY RESTRAINT APPARATUS

[76] Inventor: John Marshall, 25044 Marshall Avenue, Maple Ridge, British Columbia, Canada, V2X 1S6

[21] Appl. No.: 897,635

[22] Filed: Jul. 21, 1997

[51] Int. Cl.[6] .................................................. B60R 21/02
[52] U.S. Cl. .......................... 280/748; 280/751; 280/753; 297/487
[58] Field of Search .................................. 280/748, 751, 280/753; 297/464, 487, 488; 104/241

[56] References Cited

U.S. PATENT DOCUMENTS

| | | | |
|---|---|---|---|
| 3,393,010 | 7/1968 | Steinberg | 280/733 |
| 3,453,026 | 7/1969 | Paes et al. | 297/487 |
| 4,681,344 | 7/1987 | Majerus | 280/751 |
| 4,796,913 | 1/1989 | Amabile et al. | 280/751 |
| 4,930,808 | 6/1990 | Mikoll et al. | 280/751 |

FOREIGN PATENT DOCUMENTS 1563629  4/1969  France ................................ 280/751

*Primary Examiner*—Eric D. Culbreth
*Attorney, Agent, or Firm*—Lance A. Turlock

[57] ABSTRACT

Apparatus for restraining the movement of a passenger seated on a vehicle seat includes a restraint member which includes a horizontally extending safety bar supported by side arms extending from opposed ends of the safety bar to distal ends pivotally mounted to associated pivots which permit the restraint member to rotate about a pivot axis between open and closed positions. Pivotal movement is retarded by a fluid resistance. In another aspect, male and female latch portions of a latch such as a conventional seat belt buckle are attached in fixed positions, one to a side arm of a restraint member as described above, the other to an arm rest of a passenger seat. The positions are arranged such that the latch portions will register and latch with one another as the restraint member is pivoted from an open position to a closed position.

12 Claims, 3 Drawing Sheets

PASSENGER SAFETY RESTRAINT APPARATUS

FIELD OF THE INVENTION

The present invention relates to safety restraints for passengers in vehicles, and is considered particularly suitable for but not limited to use in school buses.

BACKGROUND TO THE INVENTION

Various restraint devices which include a safety bar adapted to extend across the lap of seated passengers have been proposed for use in school buses.

For example, U.S. Pat. No. 4,681,344 (Majerus) granted on Jul. 21, 1987, shows a restraint member comprising a horizontally extending safety bar supported by opposed side arms mounted adjacent the back of the seat immediately forward of the passengers to be restrained. When not secured, the restraint member is freely rotatable between an uptight or open position away from the passengers and a closed or restraining position above the laps of the passengers. A flexible "snap together" strap which includes a buckle (viz. like a conventional seat belt buckle) is used to secure the restraint member in the closed position. The strap is located at the aisle of the passenger seat, ostensibly to allow the driver to easily inspect whether the bar is secured, and to do so without having to leave the driver's seat.

Another example is disclosed in U.S. Pat. No. 4,930,808 (Mikoll et al.) granted on Jun. 5, 1990. Once again, the restraint member comprises a horizontally extending safety bar supported by opposed side arms. The side arms extend downwardly and forwardly to pivots carried by the framework of the seat or by other support means immediately forward of the passengers to be restrained. The restraint member is freely rotatable between open and closed positions and may be secured in the closed position utilizing a flexible strap and buckle or "snap together" strap as in the case of Majenis.

A further example is shown in U.S. Pat. No. 4,796,913 (Amabile et al.) granted on Jan. 10, 1989. In this case, the restraint member again comprises a horizontally extending safety bar supported by opposed side arms, but the side anis are each attached by a hinge plate mounted to the framework of the seat immediately forward of the passengers to be restrained. Each side arm appears to include a lock pin which contacts a camming surface presented by the associated hinge plate to position the side arm vertically when the restraint member is in an upper limit or open position, and to position the side arm horizontally when the restraint member is in a closed or restraining position. When the side arms are not engaged by the lock pins, the restraint member is freely rotatable between the open and closed positions. Amabile et al. also describe the use of a flag placed on the restraint member in a position which is visible through a driver's rear view mirror when the restraint member is in the open position. The driver can then remind the passenger to lower or close the restraint member if it is seen to be open when it should be closed.

As is noted by Amabile et al., an important consideration in the design of restraint systems for school buses is the need to compen sate for the attitudes of children or young people who may refuse to wear or who may resent wearing conventional seat belts or harnesses. Restraint systems which rely upon the use of safety bars serve to partially address such concerns. However, some of the advantage is lost if there remains a need to secure straps such as those taught by Majerus and by Mikoll et al. Further, a rebellious child may be no more inclined to use a safety bar than a conventional seat belt if he or she can easily avoid doing so. Indicators visible in a driver's rear view mirror that a particular restraint system is not in a secure position represent only a partial solution because the driver cannot drive and constantly observe a bus load of passengers at the same time.

While Amabile et al. avoid the use of safety straps which are designed along the lines of conventional seat belts, the unconventional mechanisnm which they propose for securing their restraint member in a closed position can lead to undesirable delay if an emergency evacuation of the vehicle is required. More particularly, most children or young people will be very familiarwith the use of a quick release buckle like those associated with a safety strap. Accordingly, in an emergency situation, they are more likely to have and to retain the presence required to effect a quick release of the restraint member. In contrast, the design of Amabile et al. would appear to require a passenger to remember to pull the bar towards himself or herself in order to release the restraint member. While on its face such a procedure is simple and straightforward, the fact that it is unconventional creates a greater risk that it will be forgotten, especially by children and young people who may be in a state of agitation or panic during an emergency.

In addition, safety bar systems lead to an attitudinal concern of their own. More particularly, the rambunctious and undisciplined character of some children and young people can prompt them to slam safety bars up and down not only to the annoyance of other passengers but to the potential injury of themselves or other passengers. Safety bars which are freely rotatable between open and closed positions are particularly subject to this problem.

Accordingly, it is an object of the present invention to provide a new and improved safety bar apparatus for restraining the movement of a passenger seated on a vehicle seat, and which serves to mitigate or further mitigate one or more of the concerns expressed above.

More particularly, one object of the present invention is to provide a safety bar restraint apparatus in which the safety bar cannot be slammed up and down, thereby reducing the risk of injury that such activity otherwise presents.

A further object of the present invention is to provide a safety bar restraint apparatus which may be made self securing in the closed position and which compensates against the need for a driver to check whether the bar is secured.

Yet another object of the present invention is to provide a safety bar restraint apparatus which may be made self securing while permitting release from a closed position in a familiar and conventional manner.

SUMMARY OF THE INVENTION

In one aspect of the present invention, there is provided apparatus for restraining the movement of a passenger seated on a vehicle seat, the apparatus comprising a restraint member which includes a horizontally extending safety bar supported by opposed side arms, and fluid resistance means for retarding the movement of the restraint member. The side arms extend from opposed ends of the safety bar to distal ends pivotally mounted to associated pivots which permit the restraint member to rotate about a pivot axis between a first angle of rotation where the safety bar is held by the side arms upwardly and away from the lap of a passenger (viz. an open position) and a second angle of rotation where the safety bar extends across the lap of the passenger (viz. a closed or restraining position). A means for releasably latching the restraint member in the closed position is also provided.

In a preferred embodiment, the fluid resistance means comprises a fluid cylinder connected at one end to one of the side arms and at an opposed end to a fixed support member such as a rail or other structural component of the vehicle. Further, the restraint member is preferably balanced to rotate under its own weight from the open position or first angle of rotation to the closed position or second angle of rotation, and to do so against resistance offered by the cylinder.

The fluid resistance means serves to prevent passengers from slamming the restraint member between open and closed positions. Further, while it does not "latch" the restraint member at any position, the resistance which it offers cooperates with the latching means to absorb the shock which occurs if a passenger is thrust against the safety bar during a collision.

Advantageously, the latching means may comprise male and female latch portions, a first one of the portions being attached in a fixed position to the restraint member, and a second one of the portions being fixedly positioned to releasably latch with the first one of the portions as the restraint member rotates into the closed position or second angle of rotation. If the restraint member is balanced in the manner described above, then the apparatus can then be made self latching or self securing in the closed position. Further, any passenger who resists using the restraint member must not only hold it open but must first release the latching means and then work against the fluid resistance means in order to do so all of which is doable, but with added difficulty over those systems which are not self securing or which offer little or no resistance to movement of the restraint member when it is unsecured. Accordingly, any propensity not to use the restraint member is reduced.

In another aspect of the present invention, there is provided apparatus for restraining the movement of a passenger seated on a vehicle seat which extends from an inner wall of the vehicle to a passenger aisle of the vehicle (viz. as in a bus). The apparatus includes a restraint member as described above and means for releasably latching the restraint member in a closed position. Such latching means includes male and female latch portions which are preferably male and female portions of a conventional seat belt buckle. A first one of the latch portions is attached in a fixed position to a side arm of the restraint member which extends near the aisle, and a second one of the latch portions is attached to a passenger arm rest mounted to the seat near the aisle. The second latch portion is fixedly positioned to releasably latch with the first latch portion as the restraint member rotates into the closed position, and can be easily reached for quick release.

It may be noted that the seats of many buses, particularly school buses, do not include passenger arm rests. They are simple bench seats. In such cases, arm rests must be added to the structure of the seats to utilize the foregoing feature. However, such an addition will serve not only to permit use of the latching means just described but also to restrain passengers from being thrown sideways into the aisle in the event of a collision.

The foregoing and other features and advantages of the present invention will now be described with reference to the drawings.

DETAILED DESCRIPTION OF PREFERRED EMBODIMENT

Figure 1:
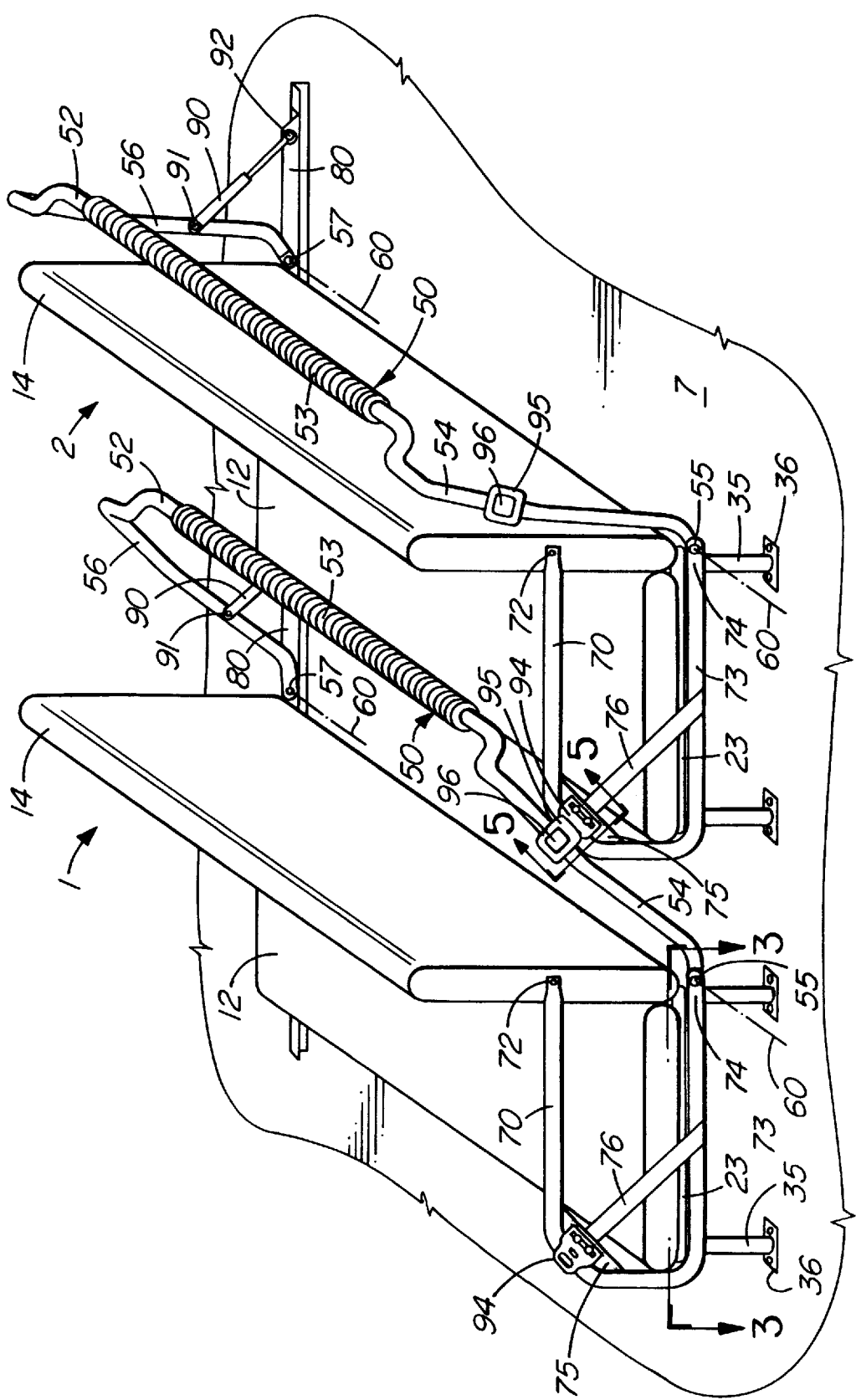
FIG. 1 is an isometric view from the aisle side of a conventional school bus illustrating two bench seats together with passenger restraint apparatus in accordance with the present invention.

Bench seats 1, 2 shown in FIG. 1 are standard seats and represent two of several such seats on one side of the passenger aisle of a conventional school bus. Each seat includes a padded seat portion 12 and a padded back portion 14 supported by a framework, the latter of which is best shown in FIG. 2 where it is generally designated 20.

Figure 2:
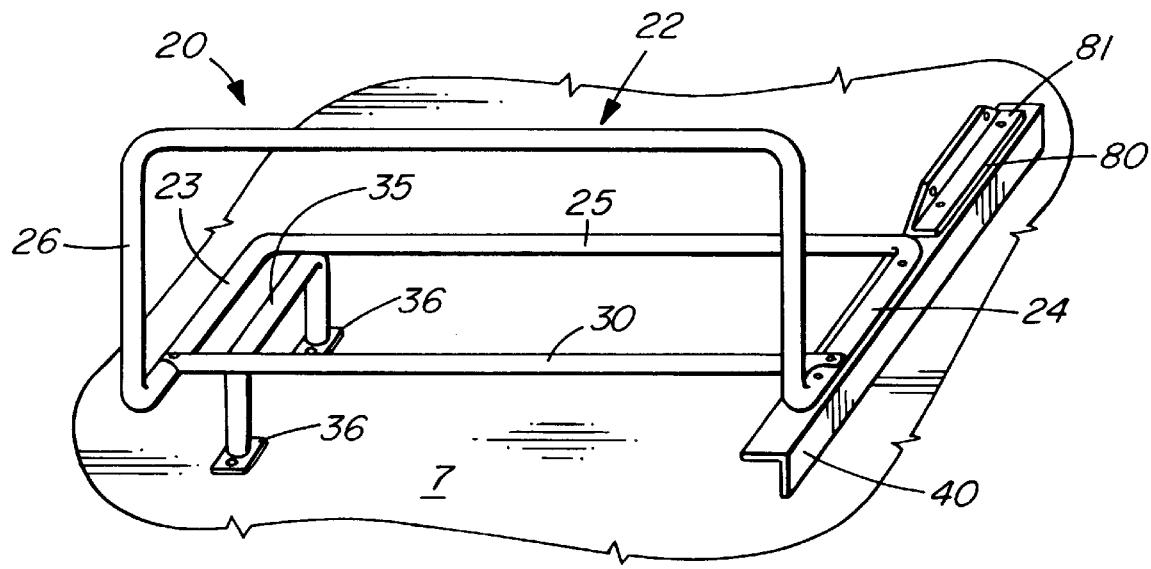
FIG. 2 is an isometric view from the rear illustrating the conventional framework of one of the bench seats shown in FIG. 1.

As best seen in FIG. 2, framework 20 is formed from tubular metal components including an L-shaped frame section generally designated 22, a crossmember brace 30, and an inverted U-shaped leg section 35. One side 23 of frame section 22 extends adjacent the aisle of the bus. Opposed side 24 of frame section 22 extends adjacent the inner side of a wall (not shown) of the bus and is bolted to a rail 40 which extends along such wall. leg section 35 is welded to front side 25 of frame section 22 and to crossmember 30. Each end of leg section 35 includes a floor plate 36 used to secure the ends to floor 7 of the bus.

The foregoing construction is a conventional construction. It has been illustrated in some detail herein because the embodiment of the invention described below is a retrofit which has been designed to be easily integrated with the given construction.

Referring now to FIG. 1, the passenger restraint apparatus shown therein includes a U-shaped restraint member generally designated 50 which includes a horizontally extending safety bar 52 supported by opposed side arms 54, 56. Bar 52 includes vinyl covered protective foam padding 53.

Apart from padding 53, restraint member 50 is formed from a continuous length of metal tubing. Side arm 54 on the aisle side of each seat extends from one end of bar 52 to a pivot mounting generally designated 55. Similarly, side arm 56 on the interior or wall side of each seat extends from the opposed end of bar 52 to a pivot mounting generally designated 57. Pivots 55, 57 permit restraint member 50 to rotate about a pivot axis 60 between a first angle of rotation or open position as shown at the rear of seat 2 and a second angle of rotation or closed position as shown at the rear of seat 1. In the closed position behind seat 1, safety bar 52 extends across the lap of a passenger or passengers (not shown) seated in seat 2. In the open position behind seat 2, safety bar 52 is held by side arms 54, 56 upwardly and away from the lap of a passenger or passengers seated behind seat 2 in a seat (not shown) like seats 1, 2.

Figure 3:
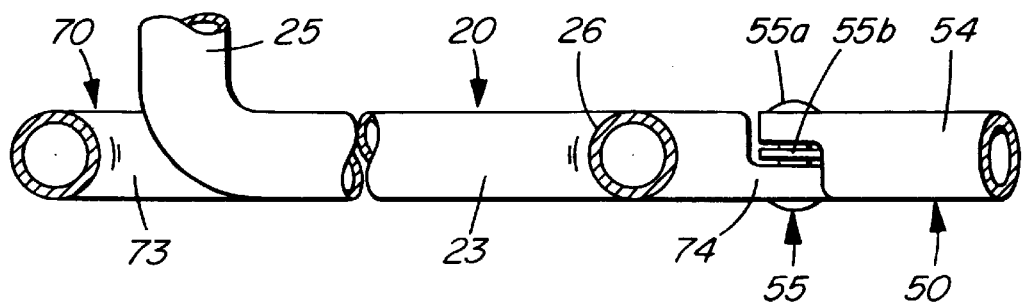
FIG. 3 is a top view taken along line 3—3 in FIG. 1, the view being limited to a portion of the framework of a bench seat, an arm rest therefor, and a pivot for a side arm on the aisle side of the restraint member shown in FIG. 1.

As illustrated in more detail in FIG. 3, pivot 55 comprises a bolt 55a and a nylon washer 55b which pivotally connect side arm 54 of restraint member 50 to lower end 74 of a C-shaped arm rest generally designated 70. Arm rest 70 is formed from metal tubing and, as shown in FIG. 1, extends from an upper end 72 to lower end 74.

It may be noted that arm rests 70 shown in FIG. 1 are not part of the original framework for seats 1, 2. Rather, they are retrofitted to the framework. In the case of each seat, this is done by welding lower side 73 of the arm rest longitudinally along the bottom of side 23 of frame section 22 (see FIG. 3, only the leg sections 35 of framework 20 being visible in FIG. 1) then, by bolting upper end 72 of the arm rest to vertical side 26 of frame section 22. As shown in FIG. 1, each arm rest 70 is reinforced by a gusset plate 75 and a crossbrace 76 extending from the gusset plate to lower side 73 of the arm rest. Plate 75 and crossbrace 76 are secured to arm rest 70 by welds.

Figure 4:
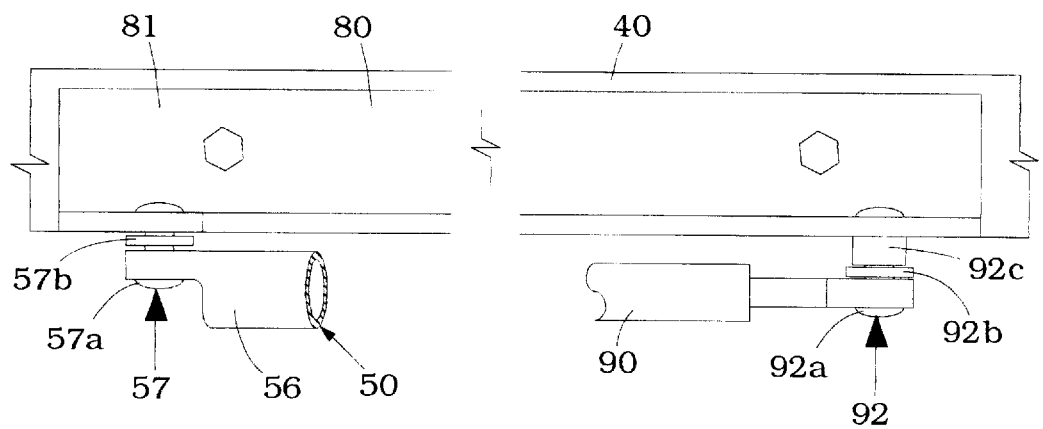
FIG. 4 is a top view of a bracket and two pivots, one of such pivots providing a mounting for a side arm on the interior side of the restraint member shown in FIG. 1, the other one of such pivots providing a mounting for a gas cylinder as shown in FIG. 1.

As illustrated in more detail in FIG. 4, pivot 57 comprises a bolt 57a and a nylon washer 57b which pivotally connect side arm 56 to forward end 81 of a bracket 80. Like arm rest 70, bracket 80 is a retrofit component. As best seen in FIG. 2, it is bolted to rail 40 immediately in advance of framework 20.

The passenger restraint apparatus shown in FIG. 1 also includes a fluid cylinder 90 pivotally connected at one end by pivot 91 to side arm 56 of restraint member 50 and at its opposed end (see FIG. 4) by pivot 92 to bracket 80. As best seen in FIG. 4, pivot 92 comprises a bolt 92a, washer 92b and spacer 92c.

Cylinder 90 provides fluid resistance against, and thereby retards, rotation of the restraint member about axis 60. In effect, it acts as a shock absorber. Thus, any effort by a passenger to rapidly slam restraint member 50 between open and closed positions is impaired. In the event of a collision which thrusts a passenger forwardly or upwardly against safety bar 52, then the resistance offered by cylinder 90 cooperates with the latching means described below to absorb some of the shock, thus helping to restrain the passenger in his or her seat.

Fluid cylinders to provide the function of cylinder 90 are known and commercially available. One source of such cylinders is the Monroe Auto Equipment (Paragould, Ark.) operating unit of Tenneco Automotive(Deerfield, Ill.). An example is their line of MAX-LIFT™ cylinders which are described as a gas-charged lift supports and are typically used in the automotive industry as a device to control the opening and closing of trunk-lids, convertible tops, tailgates, etc.

Figure 5:
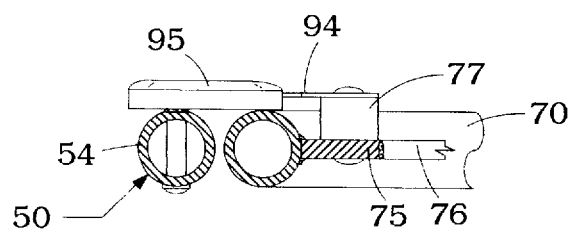
FIG. 5 is a side view taken along line 5—5 in FIG. 1 and showing in more detail the mounting of the latching means shown in FIG. 1.

The passenger restraint apparatus shown in FIG. 1 further includes means for releasably latching restraint member 50 in its closed position. As shown in more detail in FIG. 5, such latching means comprises male and female portions of a conventional seat belt buckle, the male portion 94 being attached to a built up portion 76 of gusset plate 75, the female portion 95 being attached to side arm 54 of restraint member 50 by means of a pair of bolts (only one of which is shown) spot welded to the base of portion 95.

As can be seen in FIG. 1, male portion 94 is angularly positioned to register and releasably latch with female portion 95 as restraint member 50 rotates into its closed position. Female portion 95 includes a conventional seat belt pushbutton 96 to enable quick release of the two portions when they are latched. Suitable seat belt buckles which may be adapted for use in the manner shown are commercially available from TRW Vehicle Safety Systems Inc. (Lyndhurst, Ohio).

Various modifications and changes to the embodiment which has been described can be made without departing from the scope of the present invention, and will undoubtedly occur to those skilled in the art. The invention is not to be construed as limited to the particular embodiment which has been described and should be understood as encompassing all those embodiments which are within the spirit and scope of the claims which follow.

I claim:

1. Apparatus for restraining the movement of a passenger seated on a vehicle seat, said apparatus comprising:

(a) a restraint member comprising a horizontally extending safety bar supported by opposed side arms; said side arms extending from opposed ends of said safety bar to respective distal ends of said side arms, said distal ends being pivotally mounted to associated pivots permitting said restraint member to rotate about a pivot axis between a first angle of rotation where said safety bar is held by said side arms upwardly and away from the lap of said passenger and a second angle of rotation where said safety bar extends across the lap of said passenger;

(b) a latch for releasably latching said restraint member at said second angle of rotation, said latch comprising male and female latch portions, a first one of said portions being attached in a fixed position to said restraint member, a second one of said portions being fixedly positioned to releasably latch with the first one of said portions as said restraint member rotates into said second angle of rotation; and, (c) fluid resistance means connected to said restraint member for retarding rotational movement of said restraint member about said axis.

2. Apparatus as defined in claim 1, wherein said fluid resistance means comprises a fluid cylinder connected at one end to one of said side arms and at an opposed end to a fixed support member.

3. Apparatus as defined in claim 2, wherein said restraint member is balanced to rotate under its own weight from said first angle of rotation to said second angle of rotation, and to do so against resistance offered by said cylinder.

4. Apparatus as defined in claim 1, wherein:

(a) said first one of said latch portions is attached in a fixed position to a first one of said side arms; and, (b) said second one of said latch portions is attached to a passenger arm rest of said seat and fixedly positioned to releasably latch with the first one of said portions as said restraint member rotates into said second angle of rotation.

5. Apparatus as defined in claim 4, wherein said fluid resistance means comprises a fluid cylinder connected at one end to a second one of said side arms and at an opposed end to a fixed support member.

6. Apparatus as defined in claim 5, wherein said restraint member is balanced to rotate under its own weight from said first angle of rotation to said second angle of rotation, and to do so against resistance offered by said cylinder.

7. Apparatus for restraining the movement of a passenger seated on a first vehicle seat positioned immediately rearward of a second vehicle seat, said first and second seats each having an associated framework, said apparatus comprising:

(a) a restraint member comprising a horizontally extending safety bar supported by first and second side arms; said first side arm extending from one end of said safety bar to a distal end pivotally mounted to a pivot carried by the framework of said second seat, said second side arm extending from an opposed end of said safety bar to a distal end pivotally mounted to a pivot carried by a pivot support member, said pivots permitting said restraint member to rotate about a pivot axis between a first angle of rotation where said safety bar is held by said side arms upwardly and away from the lap of said passenger and a second angle of rotation where said safety bar extends across the lap of said passenger;

(b) means for releasably latching said restraint member at said second angle of rotation, said latching means comprising male and female latch portions, a first one of said portions being attached in a fixed position to said first side arm, a second one of said portions being attached to a passenger arm rest of said first seat and fixedly positioned to releasably latch with the first one of said portions as said restraint member rotates into said second angle of rotation; and, (c) fluid resistance means for retarding rotational movement of said restraint member about said axis, said fluid resistance means comprising a fluid cylinder connected at one end to said second side arm and at an opposed end to a cylinder support member.

8. Apparatus as defined in claim 7, wherein said restraint member is balanced to rotate under its own weight from said first angle of rotation to said second angle of rotation, and to do so against resistance offered by said cylinder.

9. Apparatus for restraining the movement of a passenger seated on a seat within a bus, said seat extending from an inner wall of said bus to a passenger aisle of said bus, said apparatus comprising:

(a) a restraint member comprising a horizontally extending safety bar supported by first and second side arms, said first side arm extending near said aisle from one end of said safety bar to a distal end pivotally mounted to a first pivot, said second side arm extending near said inner wall from an opposed end of said safety bar to a distal end pivotally mounted to a second pivot, said pivots permitting said restraint member to rotate about a pivot axis between a first angle of rotation where said safety bar is held by said side arms upwardly and away from the lap of said passenger and a second angle of rotation where said safety bar extends across the lap of said passenger;

(b) a passenger arm rest mounted to said seat adjacent said aisle; and, (c) means for releasably latching said restraint member at said second angle of rotation, said latching means comprising male and female latch portions, a first one of said portions being attached in a fixed position to said first side arm, a second one of said portions being attached to said arm rest and fixedly positioned to releasably latch with the first one of said portions as said restraint member rotates into said second angle of rotation.

10. Apparatus as defined in claim 9, wherein said male and female latch portions comprise, respectively, male and female portions of a seat belt buckle.

11. Apparatus as defined in claim 9, further including fluid resistance means for retarding rotational movement of said restraint member about said axis, said fluid resistance means comprising a fluid cylinder connected at one end to said second side arm and at an opposed end to a cylinder support member.

12. Apparatus as defined in claim 11, wherein said restraint member is balanced to rotate under its own weight from said first angle of rotation to said second angle of rotation, and to do so against resistance offered by said cylinder.

* * * * *